US011147122B2

United States Patent
Xu et al.

(10) Patent No.: US 11,147,122 B2
(45) Date of Patent: Oct. 12, 2021

(54) DATA FORWARDING SUPPORT

(71) Applicant: NOKIA TECHNOLOGIES OY, Espoo (FI)

(72) Inventors: Xiang Xu, Jiangsu (CN); Dawid Koziol, Glogow (PL); Ling Yu, Kauniainen (FI); Vinh Van Phan, Oulu (FI)

(73) Assignee: Nokia Technologies Oy, Espoo (FI)

( * ) Notice: Subject to any disclaimer, the term of this patent is extended or adjusted under 35 U.S.C. 154(b) by 42 days.

(21) Appl. No.: 16/496,218

(22) PCT Filed: Mar. 22, 2017

(86) PCT No.: PCT/EP2017/056827
§ 371 (c)(1),
(2) Date: Sep. 20, 2019

(87) PCT Pub. No.: WO2018/171881
PCT Pub. Date: Sep. 27, 2018

(65) Prior Publication Data
US 2020/0029391 A1 Jan. 23, 2020

(51) Int. Cl.
*H04W 88/04* (2009.01)
*H04W 4/70* (2018.01)
(Continued)

(52) U.S. Cl.
CPC ............ *H04W 88/04* (2013.01); *H04W 4/70* (2018.02); *H04W 36/03* (2018.08); *H04W 76/14* (2018.02); *H04W 80/08* (2013.01); *H04W 92/18* (2013.01)

(58) Field of Classification Search
None
See application file for complete search history.

(56) References Cited

U.S. PATENT DOCUMENTS

2008/0117877 A1* 5/2008 Min .................. H04L 1/1874
370/331
2010/0035541 A1* 2/2010 Kim .................. H04B 7/15557
455/9
(Continued)

FOREIGN PATENT DOCUMENTS

WO 2016159841 A1 10/2016
WO 2017022958 A1 2/2017

OTHER PUBLICATIONS

International Search Report and Written Opinion for International Application No. PCT/EP2017/056827, dated Dec. 15, 2017, 13 pages.
(Continued)

*Primary Examiner* — Faruk Hamza
*Assistant Examiner* — Cassandra L Decker
(74) *Attorney, Agent, or Firm* — Brake Hughes Bellermann LLP

(57) ABSTRACT

Apparatuses and methods in a communication system, are provided. The method comprises controlling (500) communication between a first user terminal and the apparatus and the communication between a second user terminal and the apparatus, wherein the first user terminal acts as a relay by relaying data packets between the apparatus and the second user terminal; determining (502) whether the first user terminal or the transmitting end of data packets in the connection between the apparatus and the second user terminal will buffer data packets addressed to but not successfully received by the receiving end and transmitting (504) an indication regarding the determination to the first user terminal.

25 Claims, 7 Drawing Sheets

(51) Int. Cl.
    *H04W 76/14*     (2018.01)
    *H04W 36/00*     (2009.01)
    *H04W 80/08*     (2009.01)
    *H04W 92/18*     (2009.01)

(56) References Cited

U.S. PATENT DOCUMENTS

| | | | | |
|---|---|---|---|---|
| 2010/0238939 | A1* | 9/2010 | Lee | H04L 45/20 370/400 |
| 2011/0080891 | A1* | 4/2011 | Cai | H04W 36/0033 370/331 |
| 2012/0028631 | A1* | 2/2012 | Chun | H04B 7/2606 455/422.1 |
| 2012/0149298 | A1* | 6/2012 | Jiang | H04W 72/1252 455/7 |
| 2012/0250605 | A1* | 10/2012 | Du | H04W 28/12 370/315 |
| 2018/0027429 | A1* | 1/2018 | Li | H04W 24/02 455/426.1 |
| 2019/0335521 | A1* | 10/2019 | Shi | H04W 80/04 |
| 2019/0357280 | A1* | 11/2019 | Lee | H04W 8/26 |
| 2020/0053802 | A1* | 2/2020 | Li | H04L 41/5077 |
| 2020/0068581 | A1* | 2/2020 | Xu | H04L 1/1841 |

OTHER PUBLICATIONS

Office Action for European Application No. 17713909.4, dated Jul. 19, 2021, 7 pages.

\* cited by examiner

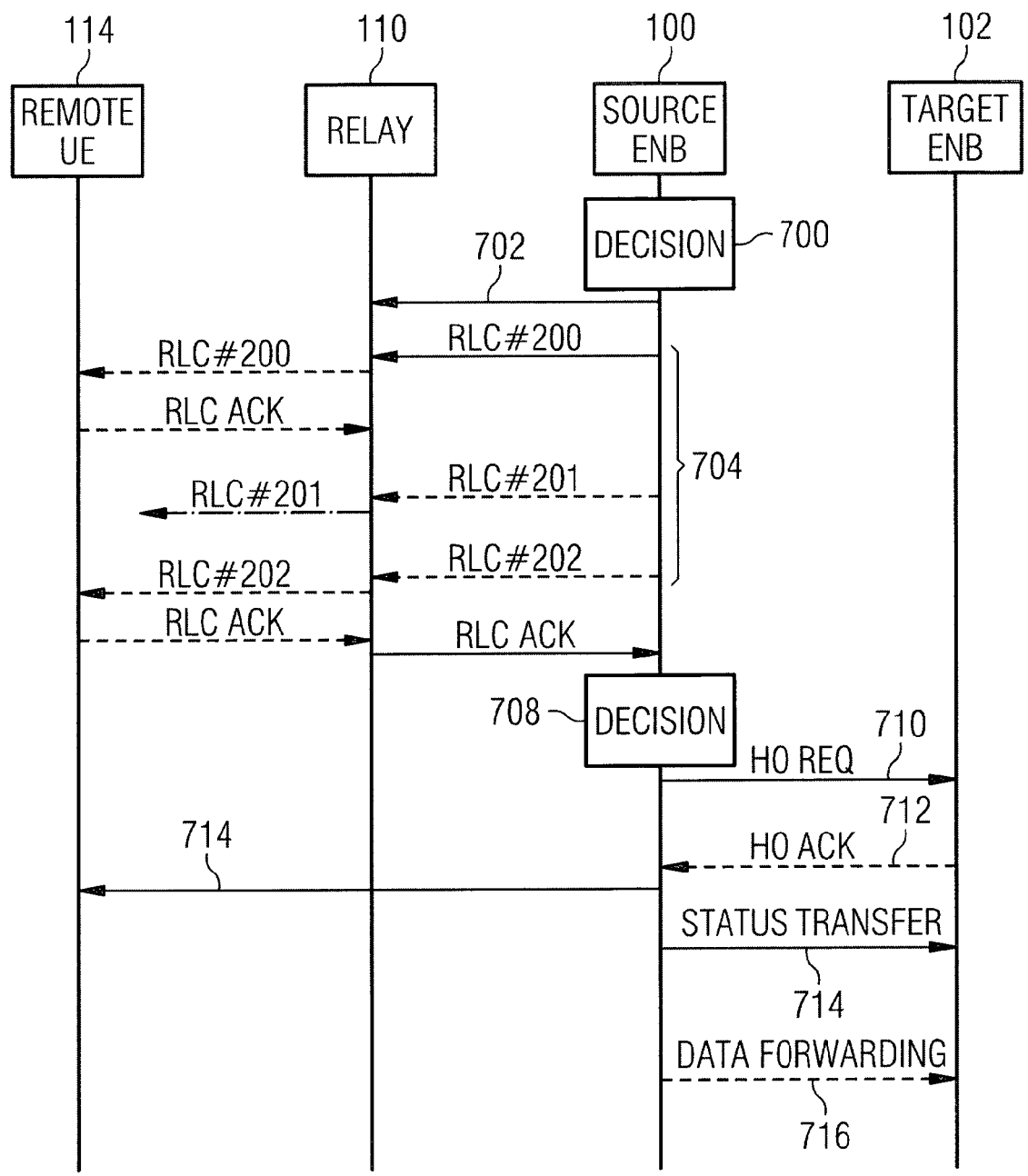

DATA FORWARDING SUPPORT

CROSS-REFERENCE TO RELATED APPLICATIONS

This application is a national stage entry of International Application No. PCT/EP2017/056827, filed Mar. 22, 2017, entitled "DATA FORWARDING SUPPORT" which is hereby incorporated by reference in its entirety.

TECHNICAL FIELD

The invention relates to communications.

BACKGROUND

In recent years, mobile Internet services have grown phenomenally. In addition to the proliferation of smart phones, laptops and tablets, other communication capable devices have entered the market. Examples of these devices include wearable devices like fit-bands, smartwatches, body sensors, medical devices etc. These devices are becoming more and more powerful and many of them are supposed to support all kinds of services and traffic types including high priority traffic like VoIP communications or emergency calls.

Traditionally in cellular radio communication networks, network planning comprises the use of common base stations to which user terminal are connected. In modern networks such as the Long Term Evolution (LTE) or the LTE-Advanced (LTE-A) of the 3rd Generation Partnership Project (3GPP), use terminals may communicate with a base station via other user terminals, which other user thus act as relays. Thus some user terminals, especially the wearable devices mentioned above, may be designed to be capable of both direct 3GPP communications (data exchanged directly between the user terminal and network) and indirect 3GPP communication (data exchanged between the user terminal and a base station via another user terminal acting as a terminal-to-network relay). Hence one of the very important objectives of the work ongoing in the development of modern 3GPP networks is to ensure that service continuity is kept even when the devices are moving around the network, including the cases where a switch or handover between direct and indirect 3GPP communications is required.

BRIEF DESCRIPTION

The following presents a simplified summary of the invention in or-der to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1, 13, and 17.

According to an aspect of the present invention, there are provided methods of claim 21.

BRIEF DESCRIPTION OF DRAWINGS

One or more examples of implementations are set forth in more detail in the accompanying drawings and the description below. Other features will be apparent from the description and drawings, and from the claims.

FIGS. 6 and 7 are signalling charts illustrating some embodiments;

DETAILED DESCRIPTION OF SOME EMBODIMENTS

Embodiments of the present invention are applicable to any access network/system and apparatus that can be or are configured to support indirect communication where terminals may communicate with base station via other user terminals, which other user thus act as relays. Examples of such access networks/systems include LTE (Long Term Evolution) access system, Worldwide Interoperability for Microwave Access (WiMAX), Wireless Local Area Network (WLAN), LTE Advanced (LTE-A), and beyond LTE-A, such as 4G (fourth generation) and 5G (fifth generation). The specifications of different systems and networks, especially in wireless communication, develop rapidly. Such development may require extra changes to embodiments. Therefore, all words and expressions should be interpreted broadly and they are intended to illustrate, not to restrict, the embodiments of the invention.

In the following, different embodiments will be described using, as an example of an access architecture to which the embodiments may be applied, a radio access architecture LTE-A.

Figure 1:
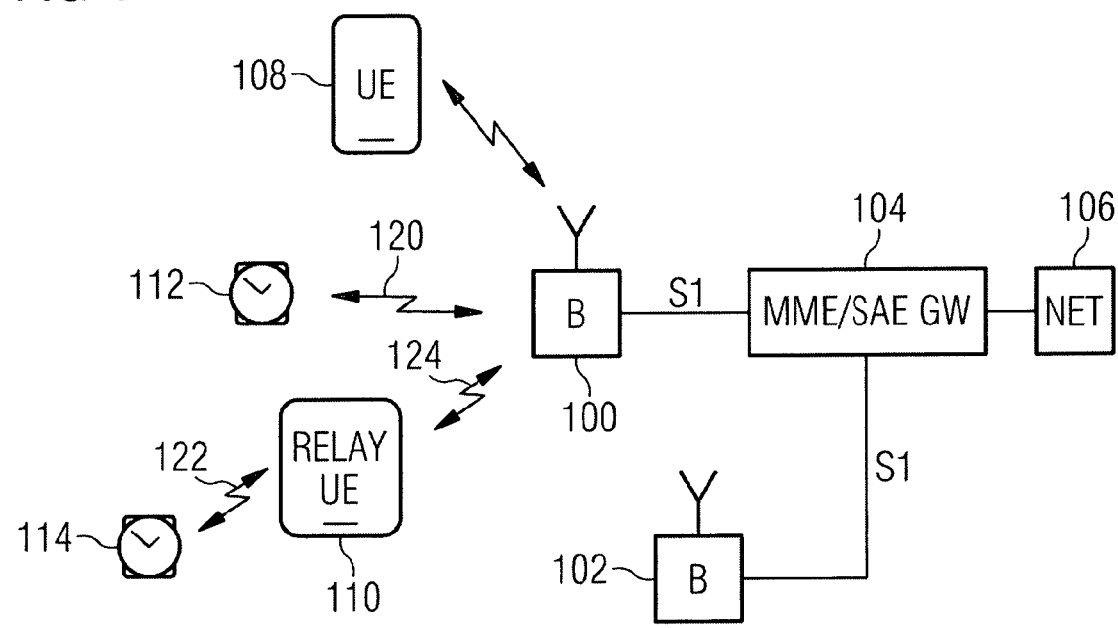
FIG. 1 illustrates an example of a general architecture of a system.

A general architecture of an exemplary system is illustrated in FIG. 1. FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary system illustrated in FIG. 1 comprises two or more network nodes 100, 102 (only two illustrated in FIG. 1), user terminals 108, 110 and remote user terminals 112, 114. The network nodes control one or more cells in a radio access system. The system further comprises a mobility management entity/serving gateway 104.

The mobility management entity (MME) represents a mobility anchor entity in a core network that is involved in the bearer activation/deactivation processes, for example. The serving gateway (SAE GW) routes and forwards user data packets further to Internet 106, for example.

A user terminal (user equipment, UE) 108, 110 illustrates one type of an apparatus to which resources on the air interface are allocated and assigned. The user apparatus 108, 110 refers to a portable computing device that includes wireless mobile communication devices operating with or without a subscriber identification module (SIM), including, but not limited to, the following types of devices: mobile phone, smart-phone, personal digital assistant (PDA), laptop computer, computer, e-reading device, and tablet. The user apparatus 102 may be configured to support also acting as a relay for other user terminals. The user terminal may support additional communication protocols such as Bluetooth™ and Wireless Local Area Network (WLAN, WiFi) based on IEEE 802.11 standard, for example.

A remote user terminal 112, 114 illustrates a communication capable device which typically is a wearable device like a fit-band, smartwatch, body sensor, medical device or any other type of communication device. The remote user terminal may also be a user terminal similar to terminals 108, 110. The remote user terminal may support cellular communication such as LTE, LTE-A and additional communication protocols such as Bluetooth™ and Wireless Local Area Network (WLAN, WiFi) based on IEEE 802.11 stardard, for example.

In the example of FIG. 1, both network nodes 100, 102 depict an apparatus controlling one or more cells via which access is provided to the network the user apparatuses and the network nodes are connected to. In an LTE-A system, such a network node is an evolved node B (eNodeB). The evolved node B 100, or any corresponding network apparatus controlling one or more cells, is a computing device configured to control the radio resources, and connected to the evolved packet core network, thereby providing the user terminals a connection to the communication system. Typically, but not necessarily, the evolved node B comprises all radio-related functionalities of the communication whereby the evolved node B, for example, schedules transmissions by assigning certain uplink resources for the user equipment and informing the user equipment about transmission formats to be used. The nodes 100, 102 may be configured to perform one or more of evolved node B functionalities described below with an embodiment, and to perform functionalities from different embodiments.

The evolved node B also provides the cells but the exemplary embodiments may be implemented with a solution having a separate controlling apparatus, and separate cell providing apparatuses controlled by a controlling apparatus. Further, the cells may be macro cells, and/or small cells.

In the example situation of FIG. 1, the remote user terminal 112 is in direct connection 120 with eNodeB 100, while the remote user terminal 114 has a connection 122 with a via the user terminal 110 and the remote user terminal 114 is communicating with the eNodeB 100 via communication link 124 provided by the user terminal 110 which acts as a relay terminal. The connection 122 between a remote user terminal and a relay user terminal may be realised with a Sidelink communication of LTE-A (also referred to as PC5 interface), a Bluetooth™ or Wireless Local Area Network (WLAN, WiFi) connection or with any other suitable wireless communication technology.

Figure 2:
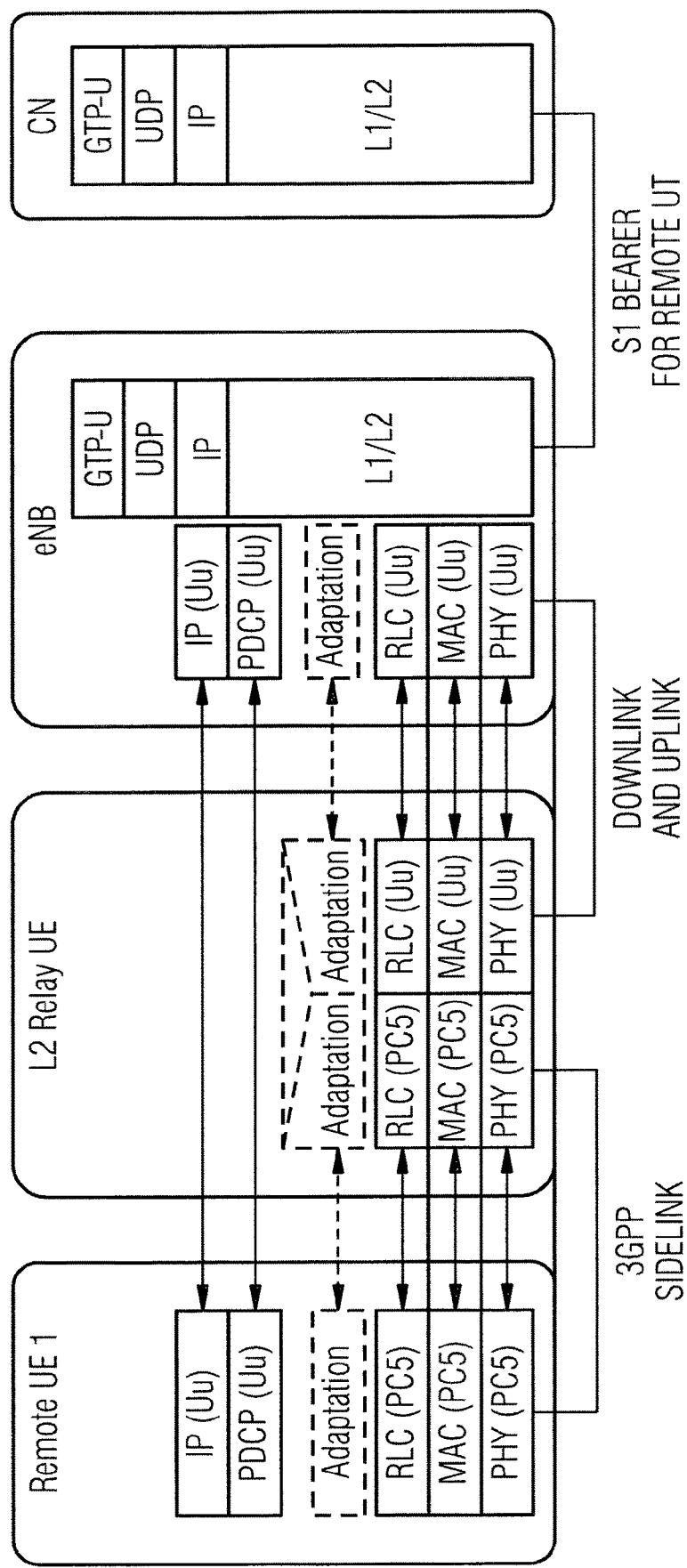
FIG. 2 illustrates an example of user plane protocol structure.

FIG. 2 illustrates an example of user plane protocol structure of a situation involving remote user terminal 114, relay user terminal 110, eNodeB 100 and core network 104. In an embodiment, the connection 122 between the remote user terminal 114 and the relay user terminal 110 is provided over LTE Sidelink (a PC5 interface).

As user terminals move around it is vital that the service the terminals are utilising continues despite the movement. The mobility of user terminals directly connected to the eNodeBs is taken into account in the design of the communication systems. However, for the newly introduced remote user terminals with are connected to the system via a relay user terminal the situation is still somewhat open. FIGS. 3A to 3D illustrate some examples of possible scenarios which may arise.

Figure 3A:
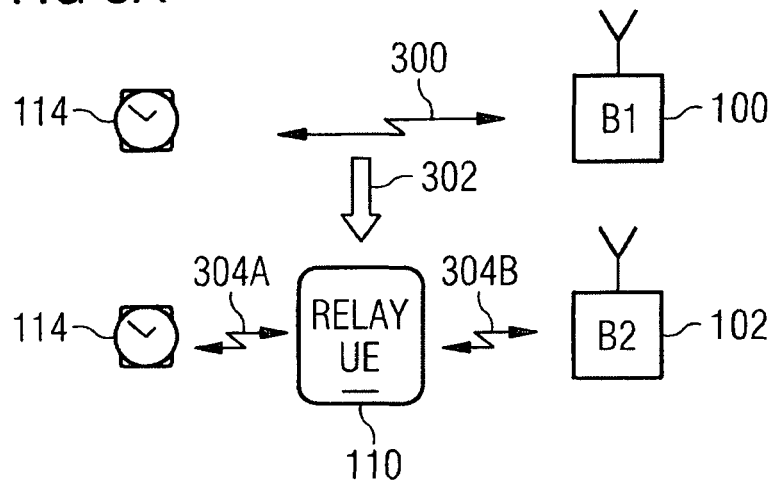
FIGS. 3A to 3D illustrate some examples of possible scenarios which may arise in connection with remote user terminals.

In FIG. 3A, the remote terminal 114 has first a direct connection 300 to eNodeB 100. The connection may change 302 such that the remote terminal 114 has an indirect connection 304A, 304B to another eNodeB 102 via a relay terminal 110.

Figure 3B:
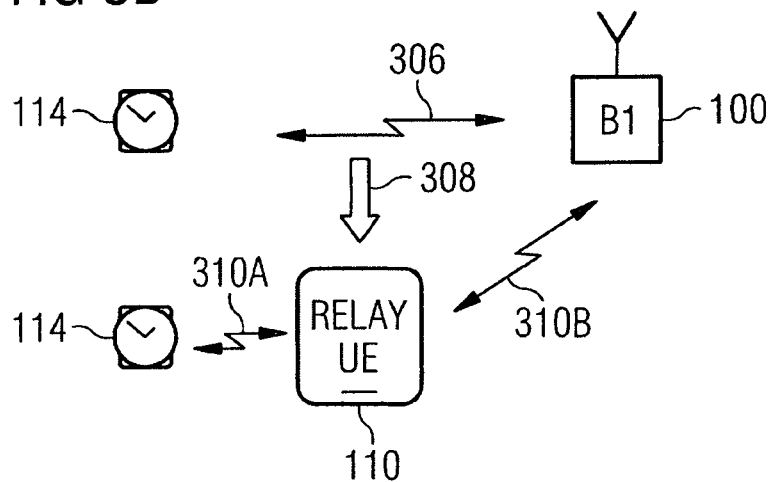

In FIG. 3B, the remote terminal 114 has first a direct connection 306 to eNodeB 100. The connection may change 308 such that the remote terminal 114 has an indirect connection 310A, 310B to the same eNodeB 100 via a relay terminal 110.

Figure 3C:
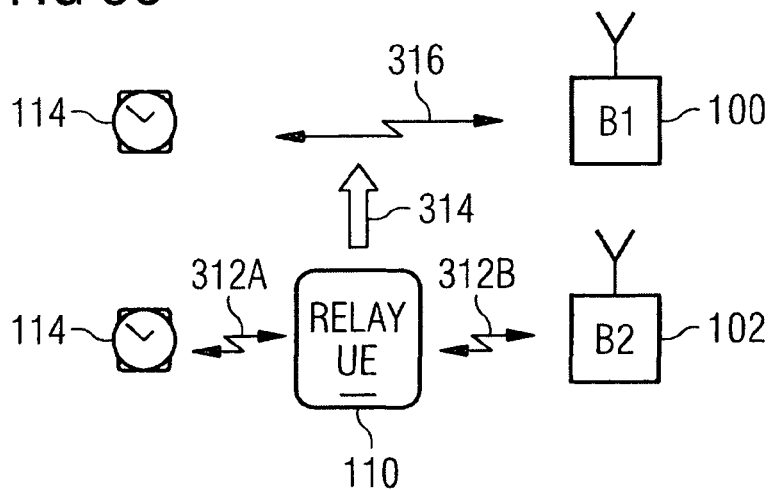

In FIG. 3C, the remote terminal 114 has first an indirect connection 312A, 312B to eNodeB 102 via a relay terminal 110. The connection may change 314 such that the remote terminal 114 has a direct connection 316 to another eNodeB 100.

Figure 3D:
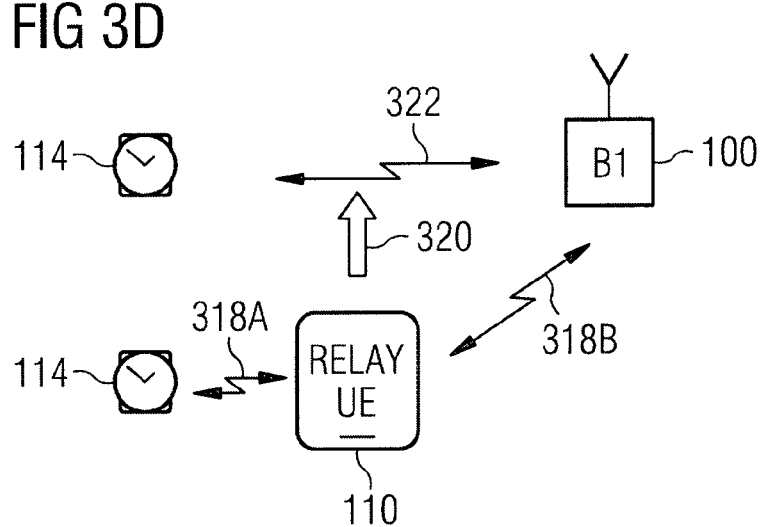

In FIG. 3D, the remote terminal 114 has first an indirect connection 318A, 3128 to eNodeB 100 via a relay terminal 110. The connection may change 320 such that the remote terminal 114 has a direct connection 322 to the same eNodeB 100.

When the remote user terminal moves from an indirect connection via a relay terminal connection to a direct connection to an eNodeB (scenarios of FIGS. 3C and 3D), the source eNodeB initiates a handover procedure when two eNodeBs are involved (as in FIG. 3C) or a path switch procedure from indirect 3GPP connection to direct 3GPP connection, when only a single eNodeB is involved (as in FIG. 3D). During the handover, the source eNodeB is configured to forward the PDCP (Packet Data Convergence Protocol) packets that have not yet been acknowledged by the remote user terminal to the target eNodeB. During the path switch procedure, the source eNodeB (being a target eNodeB at the same time) should also know which packets were received by the remote user terminal to continue the transmission using a new path (i.e. direct 3GPP connection) by sending subsequent, not yet acknowledged packets. However, there are two independent RLC (Radio Link Control) connections established; one between the remote user terminal and the relay terminal and one between the relay terminal and the source eNodeB. This causes two issues.

First, the source eNodeB may not know the downlink (DL) PDCP packets that have not been successfully received by the remote terminal. Via current RLC STATUS report, the eNodeB only knows whether a PDCP packet is successfully received by the relay terminal.

Second, the source eNodeB may not keep the DL PDCP packets that have not been successfully received by the remote terminal but the relay terminal. That is, the eNodeB may have removed a PDCP packet from its transmission buffer after receiving an acknowledgement related to the packet from the relay terminal, even in case the PDCP packet has not been received by the remote terminal.

Thus, one of the problems is that the source eNodeB does not know which PDCP packets have been successfully received by the remote terminal and which have not.

Figure 4:
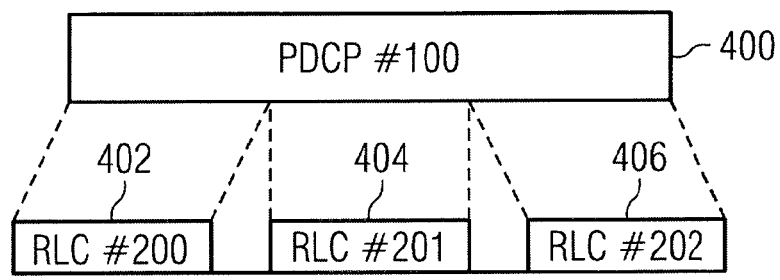
FIG. 4 illustrates an example of a PDCP packet.

FIG. 4 illustrates an example of a PDCP packet addressed to the remote user terminal. The PDCP packet 400 is transmitted to the remote user terminal as three separate RLC packets or protocol data units (PDU) 402, 404, 406. This corresponds to the case in which the PDCP packet is segmented and sent in three RLC PDUs to the relay user terminal by the serving eNodeB. It is noted that in other case more than one PDCP packets addressed to the remote user terminal may be concatenated into one RLC PDU. The remote user terminal may be configured to acknowledge each RLC packet separately, in accordance with the configured operation mode between the remote user terminal and the relay user terminal using feedback on either Medium Access Control/Physical MAC/PHY or RLC or Adaptation Layer.

Figure 5:
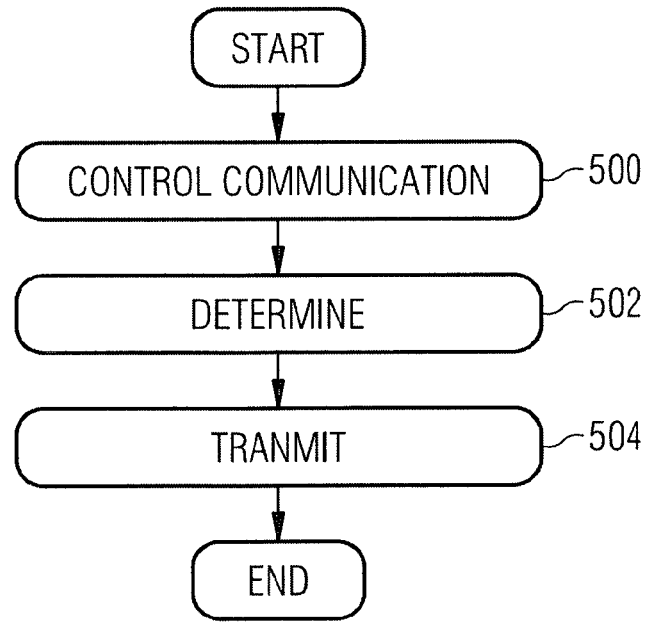
FIG. 5 is a flowchart illustrating an example of an embodiment.

The flowchart of FIG. 5 illustrates an example of an embodiment. The flowchart illustrates the operation of an apparatus. In some embodiments, the apparatus may be a base station 100 or eNodeB or a part of an eNodeB.

In step 500, the apparatus 100 is configured to control communication between a first user terminal 110 and the apparatus 100 and the communication between a second user terminal 114 and the apparatus 100, wherein the first user terminal acts as a relay by relaying data packets between the apparatus and the second user terminal.

In an embodiment, the data packets transmitted between the user terminals and the apparatus 100 are Packet Data Convergence Protocol, PDCP, packets comprising one or more Radio Link Control, RLC, packets. The RLC packets addressed to the second user terminal and successfully received by the second user terminal in downlink may be separately acknowledged by the second user terminal. Likewise, RLC packets addressed to the apparatus and successfully received by the apparatus in uplink may be separately acknowledged by the apparatus.

In step 502, the apparatus 100 is configured to determine whether the first user terminal or the transmitting end of data packets in the connection between the apparatus and the second user terminal will buffer data packets addressed to but not successfully received by the receiving end. The transmitting end and the receiving end refer to the apparatus and the second user terminal for downlink or vice versa for uplink.

Thus, in the downlink direction, the apparatus 100 is configured to determine whether the apparatus or the first user terminal will buffer data packets addressed to but not successfully received by the second user terminal.

In the uplink direction, the apparatus 100 is configured to determine whether the first user terminal or the second user terminal will buffer data packets addressed to but not successfully received by the apparatus.

In step 504, the apparatus 100 is configured to transmit an indication regarding the determination to the first user terminal. In case of uplink, the indication may be sent also to the second user terminal.

In an embodiment, the apparatus 100 is configured to transmit the indication in a flag in a header of an RLC packet.

In an embodiment, the apparatus 100 is configured to transmit the indication via dedicated signalling between the apparatus and the first user terminal (and second user terminal in case of uplink). An example of such signalling is a Radio Resource Control (RRC) message.

In an embodiment, the apparatus 100 is configured to transmit the indication in an adaptation layer header in communication between the apparatus and the first user terminal.

In an embodiment, the apparatus 100 is configured to determine which device will buffer data packets on the basis of the size of the cell or cell type (large or small) the apparatus is serving. If the size is large, it may be unlikely that a handover will happen during a connection. In such a case it may be advantageous to buffer data packets in the first user terminal acting as a relay.

In an embodiment, the apparatus 100 is configured to receive information related to the mobility of the second user terminal and determine which device will buffer data packets on the basis of the received information. Information on the mobility of the second user terminal may be obtained via the user terminal History Information or Mobility State Estimation. For example, if the user terminal moves fast, or the cell is a small cell, the user terminal may be handed over to a new cell very soon and in such a case it may be advantageous to buffer data packets in the transmitting end, i.e. base station or the second user terminal.

In an embodiment, the apparatus 100 is configured to determine which device will buffer data packets on the basis of the information received from the operator of the communication system.

Let us study an example of a downlink (DL) direction.

If the eNodeB determined that relay terminal 110 should buffer the DL PDCP packets, the relay terminal is configured to keep all RLC PDUs for a DL PDCP packet until the remote terminal has acknowledged having successfully received all RLC PDUs for that DL PDCP packet.

When the eNodeB 100 initiates a handover or a path switch, the eNodeB is configured to inform the relay terminal 110. This can be implemented via a flag in the RLC header, a flag in the Adaptation Layer header or a dedicated RRC message. This flag informs the relay terminal 110 to send back to the eNodeB all DL PDCP packets that have not been acknowledged by the remote terminal.

The relay terminal 110 is configured to send back all DL RLC PDUs of the PDCP packets unsuccessfully received by the remote terminal 114 to the eNodeB. The eNodeB is configured to extract the DL PDCP packets from the DL RLC PDUs sent back by the relay terminal.

If the eNodeB determined that the eNodeB (the transmitting end) will buffer the DL PDCP packets, the relay terminal may either delay the acknowledgement to the eNodeB until the RLC PDU is successfully received by the remote terminal or the relay terminal may first send one acknowledgement to the eNodeB indicating the RLC PDUs are successfully received by the relay terminal, then send an additional acknowledgement to the eNodeB indicating the RLC PDUs are successfully received by the remote terminal. The eNodeB may be configured to remove a PDCP packet from its transmission buffer only if all RLC PDUs of that PDCP packet are successfully received by the remote terminal. It is noted that acknowledgement of RLC PDU between the remote terminal and the relay terminal may be realized using feedback from the remote terminal on either MAC/PHY or RLC or Adaptation Layer.

The choice between these two options can be either pre-specified or network configurable. In the latter case eNodeB may inform the relay terminal about the choice via dedicated signalling.

When a handover of a remote terminal from a source eNodeB 100 to a target eNodeB 102 is executed, the source eNodeB 100 may be configured to forward all DL PDCP packets not acknowledged by the remote terminal to the target eNodeB 102.

Referring to FIG. 2, when the relay terminal is configured to buffer the DL packets, the adaptation layer may be further extended to indicate whether a certain RLC PDU is the last segment of PDCP PDU or not. In an embodiment, this can be done by adding 1 bit (e.g. 0—not a last segment, 1—last segment) or 2 bits (e.g. 0—start of the PDCP packet, 1—middle of the PDCP packet, 2—end of PDCP packet, and 3—no segmented or concatenated PDCP packets).

The relay terminal is configured to inform the eNodeB 100 when the remote terminal moves away. Upon the reception of the indication, the eNodeB may stop the transmission/retransmission of the DL packets for the related remote terminal, update/advance VT(A) variable for the relevant PDUs, modify the previous RLC PDU to remove the RLC Service Data Units (SDU) for the related remote terminal when the original RLC PDU contains the RLC SDUs for multiple user terminals. The VT(A) parameter indicates the first PDU which needs acknowledging.

In addition, when the relay terminal buffers the DL packets, dependent on the operator policy or configuration, the relay terminal may send back the buffered RLC service data units (SDU) for the remote user terminal to the eNodeB 100.

Let us study an example of an uplink (UL) direction.

In case the relay terminal is determined to buffer the UL PDCP packets, the relay terminal 110 is configured to keep all RLC PDUs for an UL PDCP packet until the eNodeB 100 has acknowledged having successfully received all RLC PDUs for that UL PDCP packet.

When a remote terminal 114 is to execute a handover from a source eNodeB 100 to a target eNodeB 102 or the path switch from indirect 3GPP communication to direct 3GPP communication, the source eNodeB is configured to inform the relay terminal. This can be implemented via a flag in the RLC header, a flag in the Adaptation Layer header or a dedicated RRC message. This flag informs the relay terminal to send back to the remote terminal all the UL PDCP packets that have not been acknowledged by the eNodeB.

The relay terminal may be configured to send back all UL RLC PDUs of the PDCP packets not acknowledged by the eNodeB to the remote terminal 114.

The remote terminal may be configured to extract the UL PDCP packets from the UL RLC PDUs sent back by the relay terminal.

In the case the remote terminal 114 (the transmitting end) is configured to buffer the UL PDCP packets, the relay terminal 110 may either delay the acknowledgement to the remote terminal until the RLC PDU is successfully received by the eNodeB 100, or the relay terminal may first send one acknowledgement to the remote terminal indicating the RLC PDUs are successfully received by the relay terminal, then send an additional acknowledgement to the remote terminal indicating the RLC PDUs are successfully received by the eNodeB. The remote terminal may be configured to remove a PDCP packet from its transmission buffer only if all RLC PDUs of that PDCP packet are successfully received by the eNodeB.

The choice between these two options can be either pre-specified or network configurable. In the latter case eNodeB may inform the relay terminal about its choice via dedicated signalling.

After a handover or a path switch has been executed, the remote terminal may send all previously unacknowledged RLC packets to the target eNodeB (which is the same as source eNodeB in case of path switch).

Referring to FIG. 2, when the relay terminal is configured to buffer the UL packets, the Adaptation Layer may be further extended to indicate whether a certain RLC PDU is the last segment of PDCP PDU or not. This can be done e.g. by adding 1 bit (e.g. 0—not a last segment, 1—last segment) or 2 bits (e.g. 0—start of the PDCP packet, 1—middle of the PDCP packet, 2—end of PDCP packet).

The proposed solution allows for lossless handover and path switch execution when data path of a remote terminal switches from an indirect communication to direct communication regardless whether the serving eNodeB changes during the process.

Figure 6:
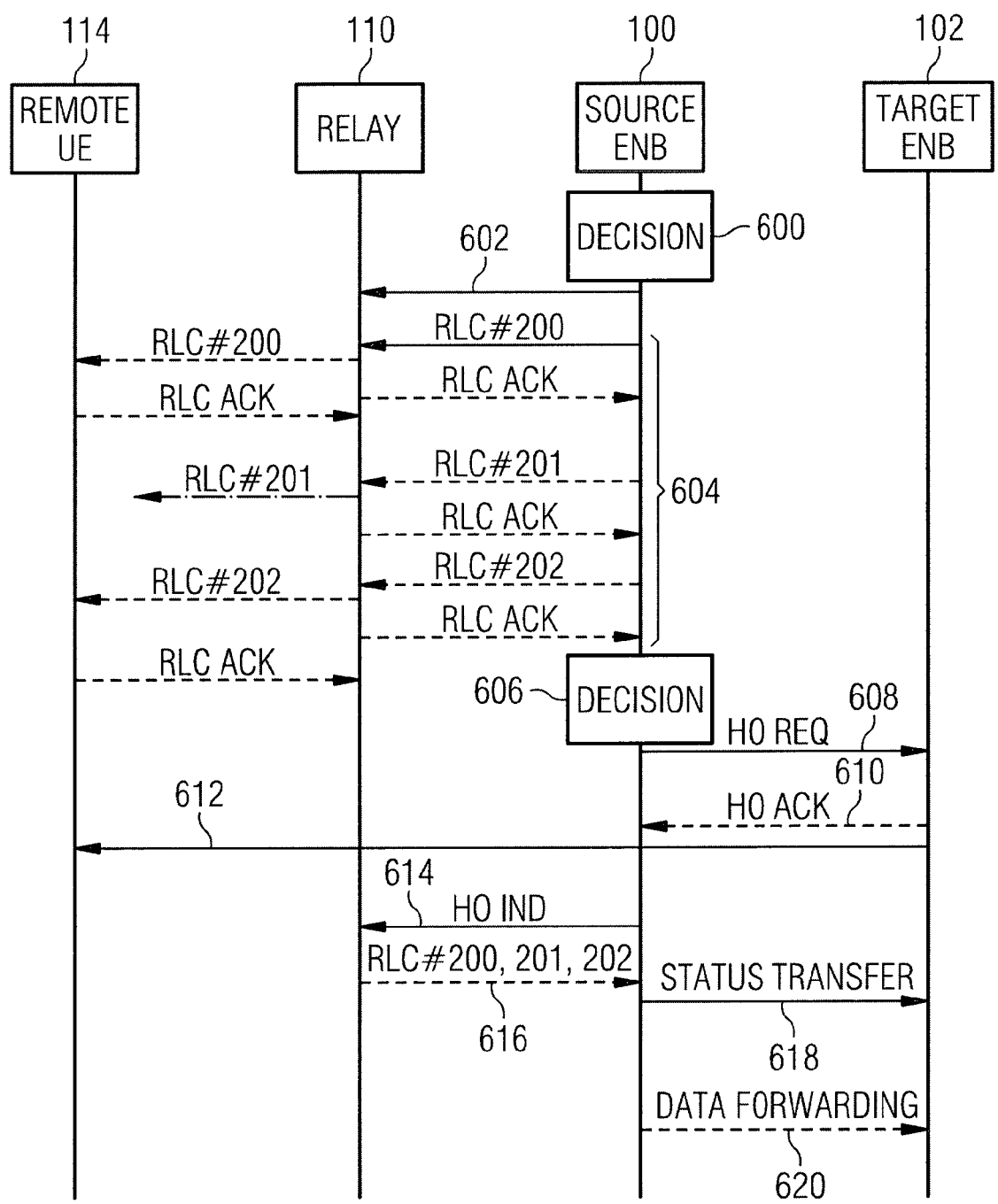

FIG. 6 is a signalling chart illustrating a downlink example where the first user terminal 110 acting as a relay terminal will buffer data packets addressed to but not successfully received by a remote terminal or second user terminal 114.

At phase 600, the source eNodeB 100 determines that relay terminal 110 should buffer the DL PDCP packets that have not been successfully received by the remote terminal 114.

The source eNodeB 100 is configured to inform 602 the relay terminal 110 about its decision. In an embodiment, the information may be sent to the relay terminal via a flag in the RLC header or Adaptation Layer header or any other header for the RLC PDU, or via a dedicated RRC message to the relay terminal.

The source eNodeB sends 604 RLC PDUs for PDCP packets. In this example, a PDCP packet #100 is sent via three RLC PDUs, RLC #200, RLC #201 and RLC #202. Relay terminal has already successfully received all RLC PDUs, and has sent acknowledgement to the source eNodeB. Relay terminal sends the RLC PDUs to the remote terminal via the connection 122 between the remote terminal and the relay terminal. The connection may be LTE Sidelink, WiFi, or Bluetooth, for example. In this example, the remote terminal successfully receives and acknowledges RLC #200 and RLC #202. However, it fails to receive RLC #201 successfully and does not send an acknowledgement regarding that packet.

The source eNodeB 100 decides 606 to handover the remote terminal 114 to target eNodeB 102 and initiates handover preparation procedure by sending a request 608 to the target eNodeB.

The target eNodeB 102 prepares handover and sends 610 a handover request acknowledge message to the source eNodeB 100.

The target eNodeB generates the RRC message to perform the handover, i.e. RRCConnectionReconfiguration message including the mobilityControlInformation, to be sent 612 by the source eNodeB towards the remote terminal.

The source eNodeB 100 informs 614 the relay terminal 110 about the start of the handover. In an embodiment, the information may be sent to the relay terminal via a flag in the RLC header or Adaptation Layer header or any other header or via a dedicated RRC message to relay terminal.

When the relay terminal knows the start of the handover of the remote terminal, the relay terminal is configured to send 616 back all RLC PDUs of the unacknowledged PDCP packets. In this example, RLC #200, RLC #201 and RLC #202 are sent back to the source eNodeB. In another example, relay UE store the previously received adaptation-layer packets of corresponding individual UE and send back to source eNB for DL or remote UE for UL when being requested. The packets which are sent back can be distinguished by the source eNodeB from normal UL PDCP packets using a flag introduced in either RLC header or adaptation layer header. In case there are no RLC packets to be sent back a dummy packet with a flag set may be sent. The source eNodeB is configured not to start the data forwarding to target eNodeB until it receives the DL RLC PDUs from the relay terminal. This ensures in order data forwarding.

If the original downlink RLC PDU contains RLC Service Data Units for multiple user terminals, the relay terminal is configured to send back the RLC PDU only containing the RLC Service Data Units for the related remote user terminal.

In case the remote terminal moves away, the relay terminal is configured to inform the source eNodeB. The eNodeB may stop the transmission/retransmission of the downlink packets for the remote terminal, update/advance the VT(A) variable for the relevant PDUs, modify the previous RLC PDU to remove the RLC SDUs for remote terminal when the original RLC PDU contains the RLC SDUs for multiple UEs. Dependent on the operator policy or configuration, the relay terminal may send back the buffered RLC SDUs for the remote terminal to the eNodeB.

The source eNodeB 100 sends 618 a SN STATUS TRANSFER message to the target eNodeB 102 to convey the uplink PDCP SN receiver status and the downlink PDCP SN transmitter status of radio access bearers for which PDCP status preservation.

Finally, the source eNodeB 100 forwards the buffered DL PDCP packets, i.e. starting from PDCP #100, to target eNodeB 102. The normal handover procedure is continued.

FIG. 7 is a signalling chart illustrating a downlink example where the eNodeB itself will buffer data packets transmitted to a remote terminal or second user terminal 114 via the first user terminal 110 acting as a relay terminal but not successfully received by the remote terminal or second user terminal 114.

At phase 700, the source eNodeB 100 determines that it will buffer the DL PDCP packets that have not been successfully received by the remote terminal.

The source eNodeB 100 informs 702 the relay terminal 110 about the decision. In an embodiment, the decision may be sent to the relay terminal via a flag in the RLC header, Adaptation Layer header or any other header for the RLC PDU, or via a dedicated RRC message to the relay terminal.

The source eNodeB 100 is configured to send 704 RLC PDUs for PDCP packets. In this example, the PDCP packet #100 is sent via three RLC PDUs RLC #200, RLC #201 and RLC #202. The relay terminal 110 receives successfully all RLC PDUs, and sends acknowledgement to the source eNodeB. The relay terminal 110 sends the RLC PDUs to the remote terminal 114 via the connection 122 between the remote terminal and the relay terminal. The connection may be LTE Sidelink, WiFi, or Bluetooth, for example. In this example, the remote terminal 114 successfully receives RLC #200 and RLC #202, but fails to receive RLC #201. Since the relay terminal knows the eNodeB will buffer the DL PDCP packets, the relay terminal may have options. First, the relay terminal may delay the RLC STATUS report, until the RLC PDUs are received by the remote terminal. Second, the relay terminal may transmit an enhanced RLC STATUS report indicating RLC PDU has been successfully received by the relay terminal, and another RLC STATUS report indicating RLC PDU has been successfully received by the remote terminal. In this example, the RLC ACK 706 indicates RLC #201 is not received by the remote terminal yet. Third, by the remote terminal is instructed to transmit the PDCP Status Report, so the eNodeB can know PDCP #100 is not received by the remote terminal yet.

In all options, the source eNodeB keeps all RLC PDUs for PDCP #100.

In case the remote terminal 114 moves away, the relay terminal 110 is configured to inform the eNodeB 100. The eNodeB may stop the transmission/retransmission of the DL packets for the remote terminal, update/advance the VT(A) variable for the relevant PDUs, modify the previous RLC PDU to remove the RLC SDUs for the remote terminal when the original RLC PDU contains the RLC SDUs for multiple UEs.

In phase 708 the source eNodeB decides to handover the remote terminal 114 to target eNodeB 102. The source eNodeB initiates 710 handover preparation procedure.

The target eNodeB 102 prepares handover and transmits 712 a handover request acknowledge to the source eNodeB 100.

The target eNodeB 102 is configured to generate the RRC message to perform the handover, i.e. RRCConnectionReconfiguration message including the mobilityControlInformation, to be sent 714 by the source eNodeB towards the remote terminal.

The source eNodeB 100 sends a SN STATUS TRANSFER message 716 to the target eNodeB 102 to convey the uplink PDCP SN receiver status and the downlink PDCP SN transmitter status of radio access bearers for which PDCP status preservation applies.

The source eNodeB 718 forwards the buffered DL PDCP packets, i.e. starting from PDCP #100, to target eNodeB 102. The normal handover procedure is continued.

Figure 8A:
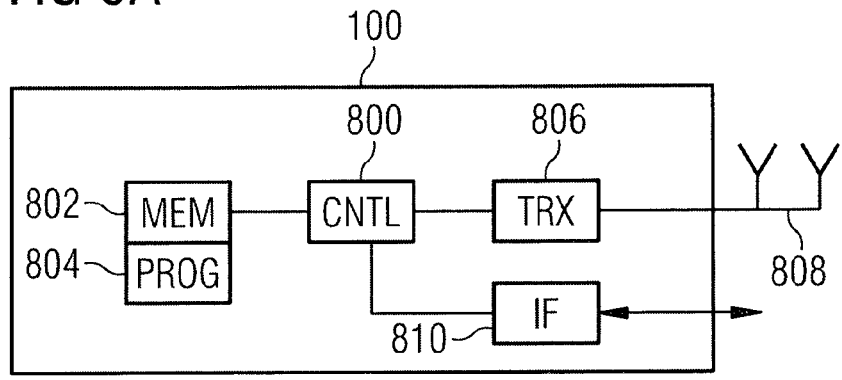
FIGS. 8A, 8B and 9 illustrates a simplified example of an apparatus in which embodiments of the invention may be applied.

FIG. 8A illustrates an embodiment. The figure illustrates a simplified example of an apparatus in which embodiments of the invention may be applied. In some embodiments, the apparatus may be a base station or eNodeB 100 or a part of an eNodeB.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 800 configured to control at least part of the operation of the apparatus.

The apparatus may comprise a memory 802 for storing data. Furthermore the memory may store software 804 executable by the control circuitry 600. The memory may be integrated in the control circuitry.

The apparatus comprises a transceiver 806. The transceiver is operationally connected to the control circuitry 800. It may be connected to an antenna arrangement 808 comprising one more antenna elements or antennas.

The software 804 may comprise a computer program comprising program code means adapted to cause the control circuitry 600 of the apparatus to control the transceiver 806.

The control circuitry 800 is configured to execute one or more applications. The applications may be stored in the memory 802.

The apparatus may further comprise an interface 810 operationally connected to the control circuitry 800. The interface may connect the apparatus to other respective apparatuses such as eNodeBs via X2 interface.

In an embodiment, the applications executable by the control circuitry 800 may cause the apparatus to control communication between a first user terminal and the apparatus and the communication between a second user terminal and the apparatus, wherein the first user terminal acts as a relay by relaying data packets between the apparatus and the second user terminal; determine whether the first user terminal or the transmitting end of data packets in the connection between the apparatus and the second user terminal will buffer data packets addressed to but not successfully received by the receiving end; and transmit an indication regarding the determination to the first user terminal.

Figure 8B:
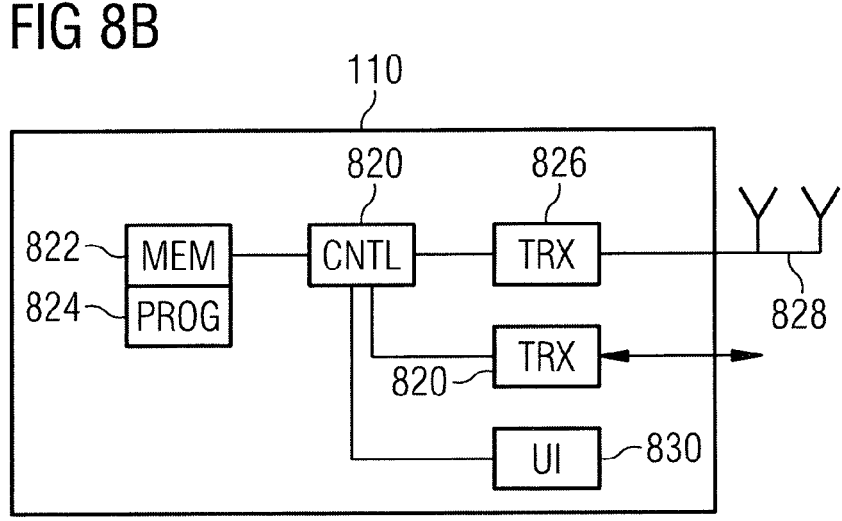

FIG. 8B illustrates an embodiment. The figure illustrates a simplified example of an apparatus in which embodiments of the invention may be applied. In some embodiments, the apparatus may be a user terminal 110 or a part of a user terminal.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 820 configured to control at least part of the operation of the apparatus.

The apparatus may comprise a memory 822 for storing data. Furthermore the memory may store software 824 executable by the control circuitry 600. The memory may be integrated in the control circuitry.

The apparatus comprises a transceiver 826. The transceiver is operationally connected to the control circuitry 820. It may be connected to an antenna arrangement 828 comprising one more antenna elements or antennas.

The software 824 may comprise a computer program comprising program code means adapted to cause the control circuitry 820 of the apparatus to control the transceiver 826.

The control circuitry 820 is configured to execute one or more applications. The applications may be stored in the memory 822.

The apparatus may further comprise a user interface 830 operationally connected to the control circuitry 820. The user interface may comprise a (touch sensitive) a display, a microphone, a speaker and a keyboard, for example.

The apparatus may comprise one or more additional transceivers 832. The transceivers may be operationally connected to the control circuitry 820. They may be connected to the antenna arrangement 828 comprising one more antenna elements or antennas or to another antenna (not shown). The one or more additional transceivers may support communication using a Bluetooth™, Wireless Local Area Network (WLAN, WiFi) connection, or LTE connection or any other suitable wireless communication technology.

In an embodiment, the applications executable by the control circuitry 820 may cause the apparatus to control communication with a base station; control communication with a second user terminal and relay data packets between a base station and the second user terminal; and receive from the base station information whether the apparatus or the base station will buffer data packets addressed to but not successfully received by the second user terminal.

Figure 9:
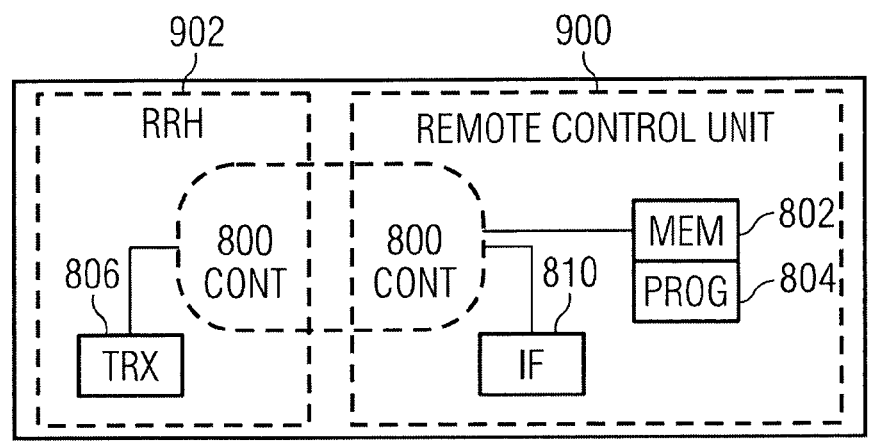

In an embodiment, as shown in FIG. 9, at least some of the functionalities of the apparatus of FIG. 8A may be shared between two physically separate devices, forming one operational entity. Therefore, the apparatus may be seen to depict the operational entity comprising one or more physically separate devices for executing at least some of the described processes. Thus, the apparatus of FIG. 9, utilizing such shared architecture, may comprise a remote control unit RCU 900, such as a host computer or a server computer, operatively coupled (e.g. via a wireless or wired network) to a remote radio head RRH 902 located in the base station. In an embodiment, at least some of the described processes may be performed by the RCU 900. In an embodiment, the execution of at least some of the described processes may be shared among the RRH 902 and the RCU 900.

In an embodiment, the RCU 900 may generate a virtual network through which the RCU 900 communicates with the RRH 902. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, comprising:
at least one processor and at least one memory including a computer program code, wherein the at least one memory and the computer program code are configured, with the at least one processor, to cause the apparatus to perform operations comprising:
control communication between a first user terminal and the apparatus and the communication between a second user terminal and the apparatus, wherein the first user terminal acts as a relay by relaying data packets between the apparatus and the second user terminal;
determine which one of the first user terminal or the apparatus will buffer data packets addressed to, but not successfully received by, the second user terminal; and
transmit an indication regarding the determination to the first user terminal.

2. The apparatus of claim 1, wherein the determination comprises determining which one of the first user terminal or the apparatus will buffer the data packets based on a size of a cell that the apparatus is serving.

3. The apparatus of claim 1, the at least one memory and the computer program code configured to, with the at least one processor, cause the apparatus further to:
receive information related to mobility of the second user terminal;
wherein the determination comprises determining which one of the first user terminal or the apparatus will buffer the data packets based on the mobility.

4. The apparatus of claim 1, wherein the determination comprises determining which one of the first user terminal or the apparatus will buffer the data packets based on information received from an operator of the communication system.

5. The apparatus of claim 1, wherein the data packets transmitted between the apparatus and the second user terminal are Packet Data Convergence Protocol, PDCP, packets comprising one or more Radio Link Control, RLC, packets, and wherein each RLC packet is separately acknowledged by the second user terminal.

6. The apparatus of claim 5, wherein the at least one memory and the computer program code are configured to, with the at least one processor, cause the apparatus further to:
transmit the indication in a flag in a header of an RLC packet.

7. The apparatus of claim 5, wherein the at least one memory and the computer program code are configured to, with the at least one processor, cause the apparatus further to:
transmit the indication via dedicated signalling between the apparatus and the first user terminal.

8. The apparatus of claim 5, wherein the at least one memory and the computer program code are configured to, with the at least one processor, cause the apparatus further to:
transmit the indication in an adaptation layer header in communication between the apparatus and the first user terminal.

9. The apparatus of claim 1, wherein the at least one memory and the computer program code are configured to, with the at least one processor, cause the apparatus, when the first user terminal buffers the data packets, further to:
transmit an indication of a handover of the second user terminal to the first user terminal;
receive, from the first user terminal, the data packets not successfully received by the second user terminal but which were transmitted to the first user terminal by the apparatus; and
store the data packets.

10. The apparatus of claim 1, wherein the at least one memory and the computer program code are configured to, with the at least one processor, cause the apparatus, when the apparatus buffers the data packets, further to:
transmit, to the first user terminal, data packets addressed to the second user terminal;
receive, from the first user terminal, information regarding the data packets transmitted to, but not successfully received by, the second user terminal; and
receive, from the first user terminal, information regarding the data packets successfully received by the second user terminal.

11. An apparatus in a communication system, the apparatus comprising:
at least one processor and at least one memory including a computer program code, wherein the at least one memory and the computer program code are configured, with the at least one processor, to cause the apparatus to perform operations comprising:
control communication with a base station;
control communication with a user terminal and relay data packets between the base station and the user terminal; and
receive, from the base station, information indicating which one of the apparatus or the base station will buffer data packets addressed to, but not successfully received by, the user terminal.

12. The apparatus of claim 11, wherein the data packets transmitted to the user terminal are Packet Data Convergence Protocol, PDCP, packets comprising one or more Radio Link Control, RLC, packets, and wherein each RLC packet is separately acknowledged by the user terminal.

13. The apparatus of claim 12, wherein the at least one memory and the computer program code are configured to, with the at least one processor, cause the apparatus, when the apparatus buffers the data packets, further to:
receive from the base station, an indication of a handover regarding the user terminal; and
transmit, back to the base station, the data packets received from the base station and directed to the user terminal, but not successfully received by the user terminal.

14. The apparatus of claim 11, wherein the at least one memory and the computer program code are configured to, with the at least one processor, cause the apparatus, when the apparatus buffers the data packets, further to:
transmit to the base station, a status report indicating whether the data packets have been successfully received or not by the user terminal.

15. An apparatus in a communication system, the apparatus comprising:
at least one processor and at least one memory including a computer program code, wherein the at least one memory and the computer program code are configured, with the at least one processor, to cause the apparatus to perform operations comprising:
control communication with a base station via a first user terminal which relays data packets between a base station and the apparatus; and
receive, from the base station, information indicating which one of the apparatus or the first user terminal will buffer data packets addressed by the apparatus to, but not successfully received by, the base station.

16. A method performed by an apparatus of a communication system, the method comprising:
controlling communication between a first user terminal and the apparatus and the communication between a second user terminal and the apparatus, wherein the first user terminal acts as a relay by relaying data packets between the apparatus and the second user terminal;
determining which one of the first user terminal or the apparatus will buffer data packets addressed to, but not successfully received by, the second user terminal; and
transmitting an indication regarding the determination to the first user terminal.

17. The method of claim 16, wherein the determination comprises determining whether the first user terminal or the apparatus will buffer the data packets based on a size of a cell that the apparatus is serving.

18. The method of claim 16, further comprising:
receiving information related to mobility of the second user terminal;
wherein the determination comprises determining which one of the first user terminal or the apparatus will buffer the data packets based on the received information.

19. The method of claim 16, wherein the determination comprises determining which one of the first user terminal or the apparatus will buffer the data packets based on information received from an operator of the communication system.

20. The method of claim 16, wherein the data packets transmitted on a connection between the apparatus and the second user terminal are Packet Data Convergence Protocol, PDCP, packets comprising one or more Radio Link Control, RLC, packets, and wherein each RLC packet is separately acknowledged by the second user terminal.

21. The method of claim 20, further comprising:
transmitting the indication in a flag in a header of an RLC packet.

22. The method of claim 20, further comprising:
transmitting the indication via dedicated signalling between the apparatus and the first user terminal.

23. The method of claim 20, further comprising:
transmitting the indication in an adaptation layer header in communication between the apparatus and the first user terminal.

24. The method of claim 16, when the first user terminal buffers the data packets, further comprising:
transmitting an indication of a handover, regarding the second user terminal, to the first user terminal;
receiving, from the first user terminal,. the data packets not successfully received by the second user terminal but which were transmitted to the first user terminal by the apparatus; and
storing the data packets.

25. The method of claim 16, further comprising, after buffering the data packets:
transmitting, to the first user terminal, data packets addressed to the second user terminal;
receiving, from the first user terminal, information regarding the data packets transmitted to, but not successfully received by, the second user terminal; and
receiving, from the first user terminal, information regarding packets successfully received by the second terminal.

* * * * *

UNITED STATES PATENT AND TRADEMARK OFFICE
CERTIFICATE OF CORRECTION

PATENT NO. : 11,147,122 B2
APPLICATION NO. : 16/496218
DATED : October 12, 2021
INVENTOR(S) : Xu et al.

It is certified that error appears in the above-identified patent and that said Letters Patent is hereby corrected as shown below:

In the Claims

In Column 15, Line 7, Claim 13, delete "receive" and insert -- receive, --, therefor.

In Column 15, Line 18, Claim 14, delete "transmit" and insert -- transmit, --, therefor.

In Column 16, Line 33, Claim 24, delete "terminal,." and insert -- terminal, --, therefor.

Signed and Sealed this
Twenty-sixth Day of April, 2022

Katherine Kelly Vidal
*Director of the United States Patent and Trademark Office*